(12) United States Patent
Rohr et al.

(10) Patent No.: US 8,956,443 B2
(45) Date of Patent: Feb. 17, 2015

(54) DEVICE FOR TRAPPING FLAMMABLE GASES PRODUCED BY RADIOLYSIS OR THERMOLYSIS IN A CONTAINMENT

(75) Inventors: Valentin Rohr, Trappes (FR); Elisa Leoni, Paris (FR); Jocelyn Prigent, Paris (FR); Michel LaTroche, Saint Cyr l'Ecole (FR)

(73) Assignee: TN Intellectual, Montigny le Bretonneux (FR)

( * ) Notice: Subject to any disclaimer, the term of this patent is extended or adjusted under 35 U.S.C. 154(b) by 0 days.

(21) Appl. No.: 13/984,094

(22) PCT Filed: Feb. 10, 2012

(86) PCT No.: PCT/EP2012/052342
§ 371 (c)(1),
(2), (4) Date: Aug. 15, 2013

(87) PCT Pub. No.: WO2012/107576
PCT Pub. Date: Aug. 16, 2012

(65) Prior Publication Data
US 2013/0312610 A1    Nov. 28, 2013

(30) Foreign Application Priority Data

Feb. 11, 2011    (FR) ...................................... 11 51136

(51) Int. Cl.
*B01D 53/22* (2006.01)
*B01D 53/04* (2006.01)
(Continued)

(52) U.S. Cl.
CPC ............ *B01D 53/22* (2013.01); *B01D 53/0407* (2013.01); *B01D 53/229* (2013.01);
(Continued)

(58) Field of Classification Search
CPC ....... B01D 53/22; B01D 53/228; B01D 63/08
USPC ..................... 95/4, 11, 108; 96/43, 45, 55, 90
See application file for complete search history.

(56) References Cited

U.S. PATENT DOCUMENTS 5,499,279 A     3/1996  Chakraborty
6,033,632 A  *  3/2000  Schwartz et al. ............. 422/617
(Continued)

FOREIGN PATENT DOCUMENTS

EP     0383153 A1   2/1990
EP     0383153 A1   8/1990
EP     0670575 A1   9/1995

OTHER PUBLICATIONS

International Search Report for PCT/EP2012/052342 dated Apr. 19, 2012, 3 pgs.

*Primary Examiner* — Jason M Greene
*Assistant Examiner* — Anthony Shumate
(74) *Attorney, Agent, or Firm* — Pearne & Gordon LLP

(57) ABSTRACT

A device for trapping flammable gases such as hydrogen comprises active means (3) inside a casing (1) which is closed except for openings which are plugged by filters (2) that normally allow only the gases that are to be trapped to pass through them. The trapping maintains a reduced pressure inside the casing, which continually draws in the gases produced outside. The trap can operate without any maintenance and for long periods of time, even in a completely enclosed environment.

10 Claims, 3 Drawing Sheets

(51) Int. Cl.
  *B01D 53/46* (2006.01)
  *B01J 20/06* (2006.01)
  *C01B 3/00* (2006.01)
  *C01B 3/50* (2006.01)
  *G21C 9/06* (2006.01)
  *G21C 19/317* (2006.01)
  *B01J 20/02* (2006.01)
  *B01D 53/62* (2006.01)
  *B01D 53/68* (2006.01)

(52) U.S. Cl.
  CPC ............... *B01D 53/46* (2013.01); *B01J 20/06* (2013.01); *C01B 3/00* (2013.01); *C01B 3/001* (2013.01); *C01B 3/0026* (2013.01); *C01B 3/0031* (2013.01); *C01B 3/503* (2013.01); *C01B 3/508* (2013.01); *G21C 9/06* (2013.01); *G21C 19/317* (2013.01); *B01J 20/02* (2013.01); *B01D 53/62* (2013.01); *B01D 53/685* (2013.01); *B01D 2251/606* (2013.01); *B01D 2253/106* (2013.01); *B01D 2253/1124* (2013.01); *B01D 2253/1126* (2013.01); *B01D 2255/1023* (2013.01); *B01D 2255/20715* (2013.01); *B01D 2257/108* (2013.01); *B01D 2257/2045* (2013.01); *B01D 2257/2047* (2013.01); *B01D 2257/502* (2013.01); *B01D 2257/80* (2013.01); *B01D 2258/02* (2013.01); *C01B 2203/0405* (2013.01); *C01B 2203/0465* (2013.01); *C01B 2203/047* (2013.01); *Y02C 10/08* (2013.01); *Y02E 30/40* (2013.01); *Y02E 60/327* (2013.01)
  USPC ................ 96/4; 95/43; 95/45; 95/55; 95/90; 96/11; 96/108

(56) References Cited

U.S. PATENT DOCUMENTS

| | | | |
|---|---|---|---|
| 6,262,328 B1* | 7/2001 | Wicks et al. ............... 588/1 |
| 6,481,747 B1* | 11/2002 | Astrauskas et al. .......... 280/741 |
| 6,686,079 B2* | 2/2004 | Zhang et al. ............... 429/417 |
| 7,779,856 B2* | 8/2010 | Adams et al. ............... 137/210 |
| 8,263,003 B2* | 9/2012 | Abadie et al. ............... 422/116 |
| 2001/0045364 A1 | 11/2001 | Hockaday |
| 2002/0011335 A1* | 1/2002 | Zhang et al. ............... 166/335 |
| 2002/0034668 A1* | 3/2002 | Zhang et al. ............... 429/25 |
| 2004/0081865 A1* | 4/2004 | Zhang et al. ............... 429/13 |
| 2005/0036941 A1* | 2/2005 | Bae et al. ............... 423/658.2 |
| 2005/0281735 A1* | 12/2005 | Chellappa et al. ............ 423/648.1 |
| 2007/0077463 A1* | 4/2007 | Adams et al. ............... 429/13 |
| 2007/0077470 A1* | 4/2007 | Adams et al. ............... 429/25 |
| 2007/0205111 A1 | 9/2007 | Bayliss |
| 2007/0256361 A1* | 11/2007 | Kindig ............... 48/197 R |
| 2011/0095208 A1* | 4/2011 | Abadie et al. ............... 250/507.1 |
| 2011/0138748 A1* | 6/2011 | Olivier et al. ............... 53/435 |
| 2014/0072836 A1* | 3/2014 | Mills ............... 429/8 |

* cited by examiner

DEVICE FOR TRAPPING FLAMMABLE GASES PRODUCED BY RADIOLYSIS OR THERMOLYSIS IN A CONTAINMENT

TECHNICAL FIELD

The subject matter of the invention is a device for trapping flammable gases produced by radiolysis or thermolysis, or both, in a containment formed in a canister or another system intended to transport and/or store radioactive materials. Such a gas, commonly produced by these phenomena, is hydrogen.

Nuclear facilities give rise to a certain quantity of "technological wastes" which may comprise objects and materials of very diverse natures such as filters, metal wastes, rubble, glass, etc., or instead cellulose based organic materials such as paper, wood, cotton, or plastic materials such as packaging covers made of vinyl or polyurethane, boots, gloves and various objects made of material known as polymer. All of these wastes can also imprison small quantities of liquids such as water and organic liquids such as oil or hydrocarbons. They all constitute materials, either activated during their time spent in the nuclear facilities, or contaminated by the powder of radioelements, including uranium or plutonium, during their use in said facilities, said radioelements being able to emit $\alpha$, $\beta$, $\gamma$ particles, etc.

The transport and the storage of these technological wastes pose a specific difficulty linked to the nature of the transported materials. In fact, as described previously, these wastes are contaminated by radioelements, including uranium or plutonium, which confer on them a radioactive character. Under the effect of the irradiation generated by the radioelements, the materials constituting the wastes can degrade and release gaseous compounds, certain of which are flammable. Among the gases produced are hydrogen, carbon monoxide and dioxide, oxygen, nitrogen as well as volatile organic compounds (VOC). This phenomenon is called radiolysis. The production of such flammable gases poses a problem when the technological wastes are confined in a closed vessel of reduced volume, since they can quickly attain a high concentration without possibility of evacuation. In the case of hydrogen, the flammability threshold in air is situated at around 4%. When the concentration exceeds this threshold, a heat source or a spark can suffice to ignite the gaseous mixture or produce a violent deflagration.

Various studies and observations have shown that the concentration of flammable gases, such as hydrogen produced by radiolysis in a closed vessel containing radioactive materials with hydrogenated components, can sometimes reach values of around 4% after several days, as when the technological wastes emit intense $\alpha$ particles and contain numerous organic molecules.

The prior art comprises various devices for trapping flammable gases such as hydrogen, particularly by a catalytic oxidation that produces a recombination of oxygen and hydrogen into water.

The patent FR-A-2 874 120 describes the use in a closed vessel of such a catalyst, to which has been added a second catalyst inciting another oxidation reaction of CO into $CO_2$, since CO is a poison of the oxidation reaction of hydrogen. The first catalyst is advantageously in the form of alumina impregnated with palladium and the second catalyst is in the form of a mixture comprising CuO and $MnO_2$.

The drawback of these recombiners by oxidation is that they only function if the blanketing atmosphere contains oxygen in sufficient quantity, which is not always true, since the radiolysis of organic matter (carbon chains in particular) does not produce oxygen and, rather the opposite, the oxygen present may be consumed by oxidation reactions of the organic matter.

The patent FR-A-2 925 752 describes a device enabling a controlled release of oxygen in a closed vessel to resolve this difficulty; but this solution remains difficult to make reliable.

Other trappers comprise metal hydrides or metal oxides, called active means or "getters", which trap the flammable gases without using oxygen. These active means may be reversible (case of metal hydrides) or irreversible (case of metal oxides). In the first case, the flammable gas may be released in specific pressure and temperature conditions. A drawback of said active means is nevertheless that the efficiency thereof is greatly reduced in the presence of poison gases, and particularly, again, CO. Yet, the thermochemical and radiolytic degradation of polymeric wastes leads to, in almost all cases, important concentrations of such poisons.

The documents U.S. Pat. No. 6,262,328 and WO-A-2010/066811 consequently describe active means coated in porous matrices which have the faculty of filtering the mixture while stopping the poisons and at the same enabling the gas that has to be trapped to reach the active means. Such matrices may be glass matrices, cement matrices, or zeolites permeable to hydrogen. A certain lack of efficiency must nevertheless be regretted, since it is difficult to optimise the distribution of active means in the matrix to enable efficient trapping: important quantities of active product are thus necessary. In addition, if the active product no longer gives satisfaction, particularly if it is saturated, it is impossible to replace it alone, the matrix having to be replaced as well.

Filtration devices further exist based on microporous membranes or others, but which do not concern the conditions of the invention since they do not concern confined vessels and are based on the establishment of gaseous currents or pressure differences to force a flow through the membranes. For example, the document EP-A-0 383 153 may be cited, where a catalyst product is arranged through an opening of the casing in which the hydrogen is produced: the catalyst is enclosed in a housing, provided with a grid at the outlet and a suspended filter, which is however permeable to all of the gases of the mixture on the side of the casing; the excess pressure gas in the casing thus passes through the filter and the catalyst before flowing outside, the hydrogen having been eliminated, here again by recombination to produce water.

The document EP-A-0 670 575 describes another device where the catalyst is deposited inside a housing, which is closed except to a filter. Said device nevertheless does not resolve the problem of poisoning of the catalyst, such that it has to remain isolated from the gas production medium until an irruption of hydrogen is noted. It is then exposed to this medium. The necessity of surveillance and manipulation of the trap or a mechanism when the trap has to become active is a major drawback for processes of very long duration where the appearance of hydrogen may be unpredictable, or quite the opposite slow and regular, which would impose leaving the trap always active to avoid the accumulation thereof. It appears that the filter does not exert any selective effect on the gases and is a simple particle filter (HEPA). It is doubtful that good efficiency can be obtained if the trap is activated for a short time instead of being activated permanently.

The basic idea of the invention consists in introducing into the containment of a canister in which radiolysis and/or thermolysis takes place a box of which at least one of the faces is equipped with a selective filter of the mixture to allow flammable gases and particularly hydrogen to pass through. The active product for trapping hydrogen is placed in the box and is thus isolated from the gaseous poisons by the filter. The contents of the box are ideally formed of pure flammable gases if the filtration is perfect. The filter has the twin function of stopping or slowing down some at least of the other gases of the mixture, and particularly stopping carbon monoxide which is a poison for the catalytic reaction, and producing a partial pressure gradient between the inside and the outside of the box, since the flammable gases are trapped as they penetrate into the box. A system is thus obtained where the hydrogen present in the containment is led into the box by the partial pressure gradient as it forms on the one hand, and that it is trapped on the other hand, whereas the poison gases do not penetrate or penetrate with great difficulty into the box. The "box" is also called "casing" in the remainder of the description.

One aspect of the invention is thus a device for trapping flammable gases and particularly hydrogen (and the isotopic forms thereof, namely the deuterated, tritiated or instead mixed forms, deuterated and tritiated) produced by radiolysis and/or thermolysis in a containment formed in a system for transporting and/or storing radioactive materials (said system being able to be a waste canister, an irradiated fuel container, or other), the device comprising a casing delimiting a cavity in which are situated active means able to trap the flammable gases, the casing being continuous except for at least one opening that is occupied by a filter and communicating exclusively with the containment, the filter allowing the flammable gases to pass through, characterised in that the filter slows down or stops other gases and particularly stops carbon monoxide.

The active means may be constituted of a metal hydride or oxide; they may be in a divided and free state in the casing, or arranged as surface coating of plates inside the casing, which guarantees that the active means are readily accessible, particularly enabling the replacement thereof when they are saturated, unlike devices where they are coated in matrices.

The filter may be constituted of a microporous layer, the filtration then taking place according to a process of steric exclusion, this inhibiting or delaying the diffusion of molecules of large size and favouring the diffusion of molecules of smallest size. Since the flammable gases comprise molecules of smaller size than those of the poison gases, the diffusion of the latter in the microporous layer is then substantially delayed, or even stopped, whereas that of the flammable gases is, quite the opposite, favoured.

The filter may be completed by a metal membrane situated under the main filter and which completes it; the filtration by the membrane only allows the flammable gases to pass through and stops all the other gases thanks to the chemical mode of the filtration. This is then carried out according to a process of absorption of the flammable gases on the surface of the membrane, dissociation, diffusion through the membrane, recombination and desorption. After having passed through the entire thickness of the metal membrane, the flammable gases are thus found within the casing.

The filter retains all its utility since it stops certain gases that could prevent by poisoning the correct operation of the metal membrane, of which, again, carbon monoxide.

The filters often comprise a porous substrate without particular filtration properties but assuring their mechanical strength.

The microporous layer may be constituted of silica, the metal membrane being able to be made of palladium, palladium-nickel, palladium-silver, palladium-copper, or vanadium-tungsten and vanadium-nickel.

If the selectivity of the filter is considered insufficient, the casing may further contain products for trapping certain poisons of the active means, such as carbonate.

The invention will now be described in a purely illustrative manner with reference to the following figures.

Figure 1:
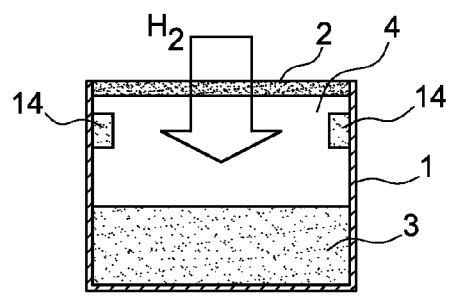
FIG. 1 is a general view of an embodiment of the invention.
Figure 2:
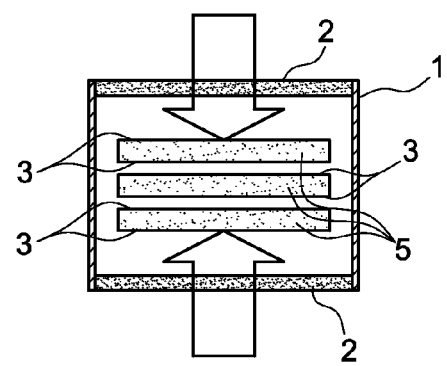
FIG. 2 represents another embodiment of the invention.

The invention (FIG. 1) comes in the form of a box delimited by a casing (1) comprising at least one opening, each opening being plugged by a filter (2). The casing (1) contains active means (3) for trapping hydrogen, and an unoccupied volume (4) opening onto the filter (2). The box is typically placed in a containment of which the contents, not represented in the figures, are subjected to a radiolysis or a thermolysis which constantly produces hydrogen but also poison gases harmful to the correct operation of the active means, such as CO, HCl or HF. The active means may be metal hydrides such as ZrCO or Zr2Fe, or metal oxides. They may be, between other arrangements, in a free and divided state at the bottom of the box or, as represented in FIG. 2, a coating of separate plates (5) suspended inside the casing (1). In this embodiment, the casing (1) comprises a double opening and thus a pair of filters (2) plugging them.

Figure 3:
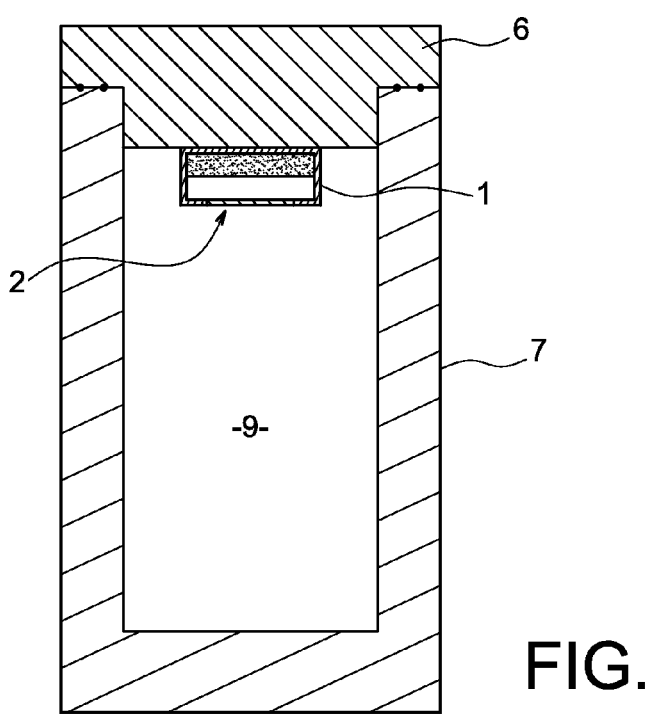
FIGS. 3, 4 and 5 illustrate two particular ways of arranging the invention.

The box may be placed in any place, for example (FIG. 3) in the containment (9) of a canister (7) in the form of a container closed by an upper cover (6): it may in particular be hanging under the cover (6), the filter (2) opening into the internal volume of the containment (9) at the top thereof: the hydrogen that forms tends to rise and be directed towards the box, where it is captured.

Figure 4:
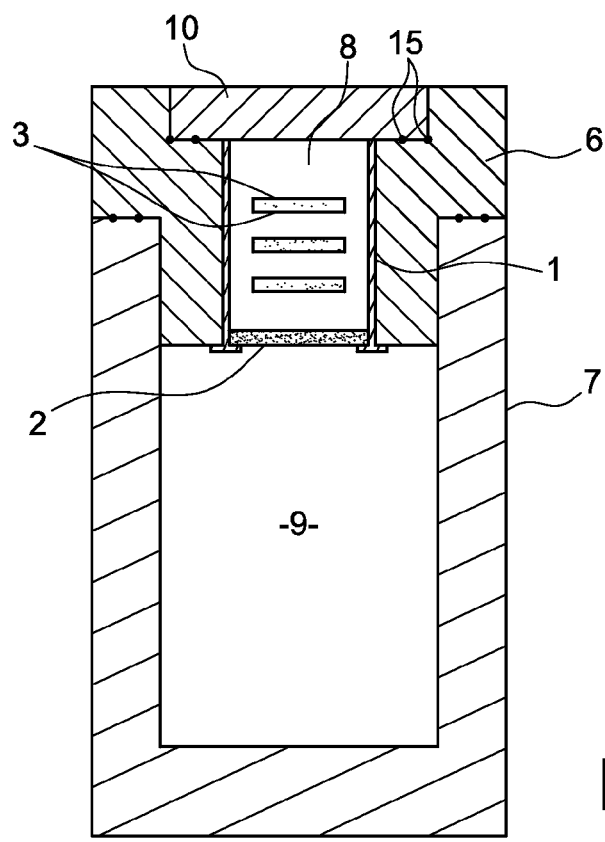
Figure 5:
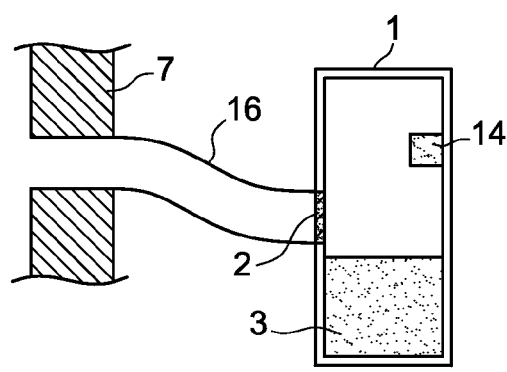

Other arrangements are however conceivable without changing the nature of the invention, such as that represented in FIG. 4, where the box is placed in the cover (6) of the canister (7); the box (8), containing the active means (3), then opens into the inside of the canister (7), through the filter (2), and to the outside through a small continuous cover (10), made leak tight by a seal (15), but which may be removed to replace the active means (3). Another possibility, represented in FIG. 5, would consist in placing the box outside of the canister (7) while connecting the inside of the box and that of the canister by a conduit (16); the conduit (16) and the opening of the casing (1) coincide, so that the filter (2) also plugs the conduit (16).

Figure 6:
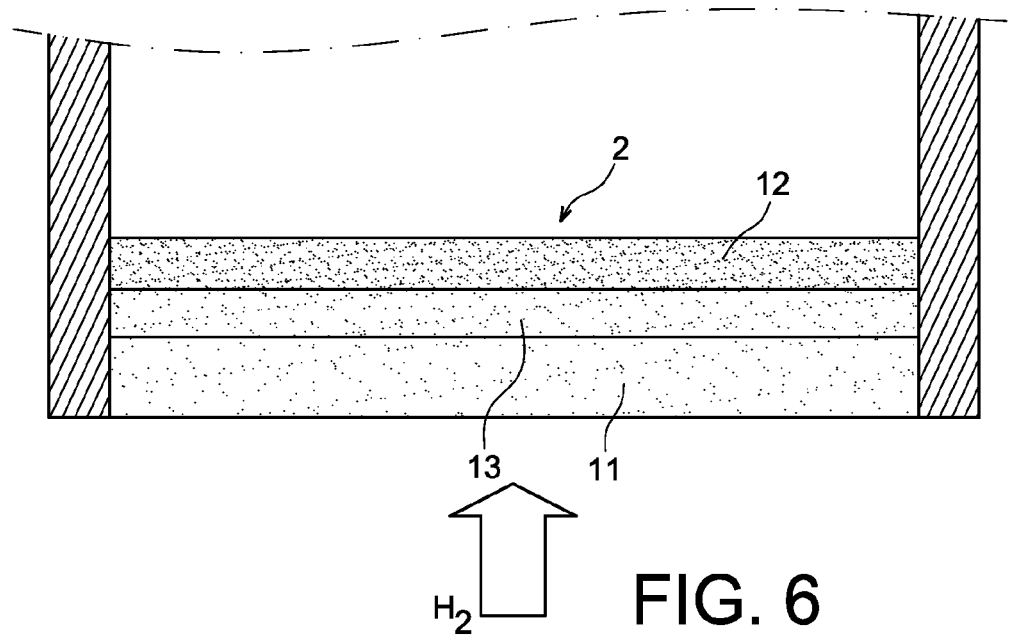
FIG. 6 illustrates the filter.

We will now move onto the description of the filter (2). It comprises, going from the outside to the inside of the box and as FIG. 6 shows, typically a porous substrate (11) assuring its rigidity and being able to be a metal frit or made of ceramic, a microporous layer (13) making it possible to stop certain poisons and a metal membrane for filtration (12) of the flammable gases, the microporous layer (13) then being situated between the metal membrane (12) and the substrate (11), which is more towards the outside of the filter (2). The metal membrane (12) may be, among others, based on palladium which has the faculty of carrying out the filtration of hydrogen by chemical means according to the process described previously. The hydrogen then passes through the metal membrane (12) according to this process. Other metal alloys, certain of which have already been mentioned, have similar filtration properties.

The microporous layer (13) is intended to protect the palladium, or more generally the material of the metal membrane (12), while stopping or slowing down the gases that could empoison it, such as CO; it may be made of silica. The composite filter as described combining metal membrane and microporous layer may be carried out by a deposition of palladium on a layer of silica, the whole being supported by the porous substrate.

According to a second embodiment, the filter (2) is constituted of a porous substrate and a microporous layer (13), which works by purely molecular filtration according to the process of steric exclusion described previously. The microporous layer may nevertheless be permeable to certain gases or molecules of small dimensions, such as poison gases, like HCl. These gases can then enter into the casing (1) and hinder the correct operation of the active means (3). Additional traps (14) may be added inside the casing (1) to fix these gases; it is nevertheless possible, in certain circumstances, to choose to place them outside the casing. An interesting trapping material, with regard to the aforementioned gases, are carbonates. Desiccants can also be added to the casing (1).

The invention claimed is:

1. Device for trapping flammable gases produced by radiolysis and/or thermolysis in a containment formed in a system (7) for transporting and/or storing radioactive materials, the device comprising a casing (1) delimiting a cavity in which are situated active means (3) able to trap the flammable gases, the casing being continuous except for at least one opening which is occupied by a filter and communicating exclusively with the containment, the filter (2) allowing the flammable gases to pass through, characterised in that the filter slows down or stops other gases and stops carbon monoxide.

2. Device for trapping gases according to claim 1, characterised in that it comprises, in the casing, and placed on the opening, a metal membrane (12) carrying out a filtration that allows only the flammable gases to pass through and placed between said filter and the active means.

3. Device for trapping gases according to claim 1, characterised in that it comprises, in the casing, traps (14) to fix gases with molecules having passed through the filter (2).

4. Device for trapping gases according to claim 3, characterised in that the traps are constituted of carbonate.

5. Device for trapping gases according to claim 1, characterised in that the filter is constituted of a microporous layer (13).

6. Device for trapping gases according to claim 5, characterised in that the microporous layer (13) is constituted of silica.

7. Device for trapping gases according to claim 1, characterised in that the filter comprises a porous substrate (11).

8. Device for trapping gases according to claim 1, characterised in that the active means are constituted of a metal hydride or oxide.

9. Device for trapping gases according to claim 1, characterised in that the active means are in a divided and free state in the casing.

10. Device for trapping gases according to claim 1, characterised in that the active means are arranged as surface coating of plates (5) inside the casing.

* * * * *

UNITED STATES PATENT AND TRADEMARK OFFICE
CERTIFICATE OF CORRECTION

| | | |
|---|---|---|
| PATENT NO. | : 8,956,443 B2 | Page 1 of 1 |
| APPLICATION NO. | : 13/984094 | |
| DATED | : February 17, 2015 | |
| INVENTOR(S) | : Valentin Pohr et al. | |

It is certified that error appears in the above-identified patent and that said Letters Patent is hereby corrected as shown below:

On the Title page, item (73) Assignee, please replace "TN Intellectual" with -- TN International --

Signed and Sealed this
Sixteenth Day of June, 2015

Michelle K. Lee
*Director of the United States Patent and Trademark Office*